(12) United States Patent  
Huang et al.

(10) Patent No.: US 9,485,261 B2  
(45) Date of Patent: Nov. 1, 2016

(54) WEB SECURITY PROTECTION METHOD, DEVICE AND SYSTEM

(71) Applicant: NSFOCUS INFORMATION TECHNOLOGY CO., LTD, Haidian District, Beijing (CN)

(72) Inventors: Mingfeng Huang, Beijing (CN); Bo Qin, Beijing (CN); Huaigu Ou, Beijing (CN); Zhiming Song, Beijing (CN); Congyu Li, Beijing (CN); Rong Zhou, Beijing (CN)

(73) Assignee: NSFOCUS INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/365,601

(22) PCT Filed: Dec. 11, 2012

(86) PCT No.: PCT/CN2012/086366  
§ 371 (c)(1),  
(2) Date: Jun. 13, 2014

(87) PCT Pub. No.: WO2013/086968  
PCT Pub. Date: Jun. 20, 2013

(65) Prior Publication Data  
US 2014/0373125 A1 Dec. 18, 2014

(30) Foreign Application Priority Data  
Dec. 16, 2011 (CN) .......................... 2011 1 0424804

(51) Int. Cl.  
*G06F 21/57* (2013.01)  
*H04L 29/06* (2006.01)  
*H04L 29/08* (2006.01)

(52) U.S. Cl.  
CPC .......... *H04L 63/1408* (2013.01); *H04L 63/02* (2013.01); *H04L 63/08* (2013.01); *H04L 63/1433* (2013.01); *H04L 67/04* (2013.01); *H04L 63/0263* (2013.01)

(58) Field of Classification Search  
CPC ............. H04L 63/107; H04L 63/0876; H04L 63/0823; H04L 63/1433; H04L 63/16; H04L 63/20; H04L 29/06904; H04L 29/06605  
See application file for complete search history.

(56) References Cited

U.S. PATENT DOCUMENTS

| | | | |
|---|---|---|---|
| 8,793,763 B2 * | 7/2014 | Williams et al. | 726/3 |
| 2010/0050249 A1 * | 2/2010 | Newman | 726/15 |
| 2013/0014264 A1 * | 1/2013 | Kennedy et al. | 726/25 |

FOREIGN PATENT DOCUMENTS

| | | |
|---|---|---|
| CN | 1384639 A | 12/2002 |
| CN | 1805385 A | 7/2006 |
| CN | 101064736 A | 10/2007 |
| CN | 101610264 A | 12/2009 |
| CN | 102523218 A | 6/2012 |
| JP | 2007-004685 A | 1/2007 |
| JP | 2009-237807 A | 10/2009 |

* cited by examiner

*Primary Examiner* — Benjamin Lanier  
*Assistant Examiner* — Paul Callahan  
(74) *Attorney, Agent, or Firm* — TIPS Group

(57) ABSTRACT

A method, device and system for network security protection comprise: according to a received scan task, a network security device performs a security bug scan of the scan task appointed web site, and when a scan result is obtained, transmits the scan result to a network application firewall, so that the network application firewall can configure a individuality security strategy for the web site according to the received scan result. The problem that it can not he implemented complete individuality security configuration of the web site can be solved in this way.

7 Claims, 3 Drawing Sheets

WEB SECURITY PROTECTION METHOD, DEVICE AND SYSTEM

The present application is a U.S. National Stage of International Application No. PCT/CN2012/086366, filed 11 Dec. 2012, designating the United States, and claiming priority to Chinese Patent Application No. 201110424804.0, filed with the Chinese Patent Office on Dec. 16, 2011 and entitled "Web security protection method, device and system", which is hereby incorporated by reference in its entirety.

FIELD OF THE INVENTION

The present invention relates to the field of information security and particularly to a web security protection method, device and system.

BACKGROUND OF THE INVENTION

Along with constant development of web technologies, WEB which is a universally applicable platform has become to bear an increasing number of core services of various organizations, e.g., electronic government affairs, electronic commerce, value-added services of operators, etc. There are consequently an increasing number of increasingly intensive attacks for various services of WEB applications. Taking website information being tampered as an example, an illegal code is loaded into information of a website to maliciously tamper the information published by the website, so that the website may suffer from a loss of credit, an economic loss and even some adverse political outcome.

Traditional security apparatus (e.g., a firewall, an anti-intrusion system) may address the security issue of the WEB applications only to some limited extent, because on one hand the traditional web firewall software has some bugs which tend to become a window of an attack; and on the other hand, the traditional web firewall cannot offer a function of real-time monitoring and consequently may generate a protection strategy with a delay.

In view of this, web security providers have proposed a Web Application Firewall (WAF) for protection of a WEB site along with the development of the web technologies. Unfortunately, a security protection solution adopted by the existing WAF is typically to configure security strategies for various WEB application threats (e.g., SQL injection, anti-stealing-link) for the purpose of protection. However, an occurrence of each WEB application threat is closely correlated with bugs present in the WEB site, which in turn are closely correlated with the service logic of the WEB site. Taking an SQL injection threat as an example, for an SQL operation on a service A, a relevant parameter a may be set as required for the service, and the parameter a needs to satisfy some rule, for example, the parameter a cannot include a special character, otherwise it may be utilized by an attacker to make an SQL attack, so this rule needs to be set in the WAF for protection; while the parameter a is not required for a service B, so there is no need of the protection. In other words, the existing WAF cannot configure comprehensively the WEB site with an individualized protection strategy.

SUMMARY OF THE INVENTION

Embodiments of the invention provide a web security protection method, device and system, so as to address the problem of an existing WAF failing to configure a WEB site with a comprehensive and individualized protection strategy.

A web security protection method includes:
receiving a scan task including address information of a WEB site to be scanned;
establishing a connection with the WEB site to be scanned according to the address information and scanning the WEB site for a security bug to obtain a scan result; and
sending the scan result to a WAF to instruct the WAF to configure the WEB site with a security strategy according to the received scan result.

A web security device includes:
a receiving module configured to receive a scan task including address information of a WEB site to be scanned;
a scanning module configured to establish a connection with the WEB site to be scanned according to the address information and to scan the WEB site for a security bug to obtain a scan result; and
a sending module configured to send the scan result to a WAF to instruct the WAF to configure the WEB site with a security strategy according to the received scan result.

A web security protection system includes:
a web security device configured to receive a scan task, to establish a connection with a WEB site to be scanned according to address information of the WEB site in the scan task, to scan the WEB site for a security bug and to send a scan result to a WAF upon obtainment of the scan result; and
the web application firewall configured to receive the scan result sent by the web security device and to configure the WEB site with a security strategy according to the scan result.

Advantageous effects of the invention are as follows:
In the embodiments of the invention, the web security device scans the WEB site specified by the scan task for a security bug upon reception of the scan task and sends the scan result to the WAF upon obtainment of the scan result, so that the WAF configures the WEB site with an individualized protection strategy according to the received scan result, to overcome the problem of failing to configure comprehensively the WEB site with individualized protection strategy.

DETAILED DESCRIPTION OF THE EMBODIMENTS

In order to achieve the object of the invention, embodiments of the invention propose a web security protection method, device and system, where the web security device scans a WEB site specified by a scan task for a security bug upon reception of the scan task and sends a scan result to a WAF upon obtainment of the scan result, so that the WAF configures the WEB site with an individualized security strategy according to the received scan result, to overcome the problem of failing to configure comprehensively the WEB site with an individualized security strategy.

The web security device as referred to in the embodiments of the invention refers to a device with a function of remotely scanning a WEB site for a security bug. The web security device based upon a "cloud security" mechanism can ensure a real-time update to a bug library. The device with the function of scanning a WEB site for a security bug may be a Web Security Platform (WSP), which may not be installed at the WEB site but can provide the WEB site with a remote scan service in response to a trigger of the WAF.

The embodiments of the invention will be described below in details with reference to the drawings.

First Embodiment

Figure 1:
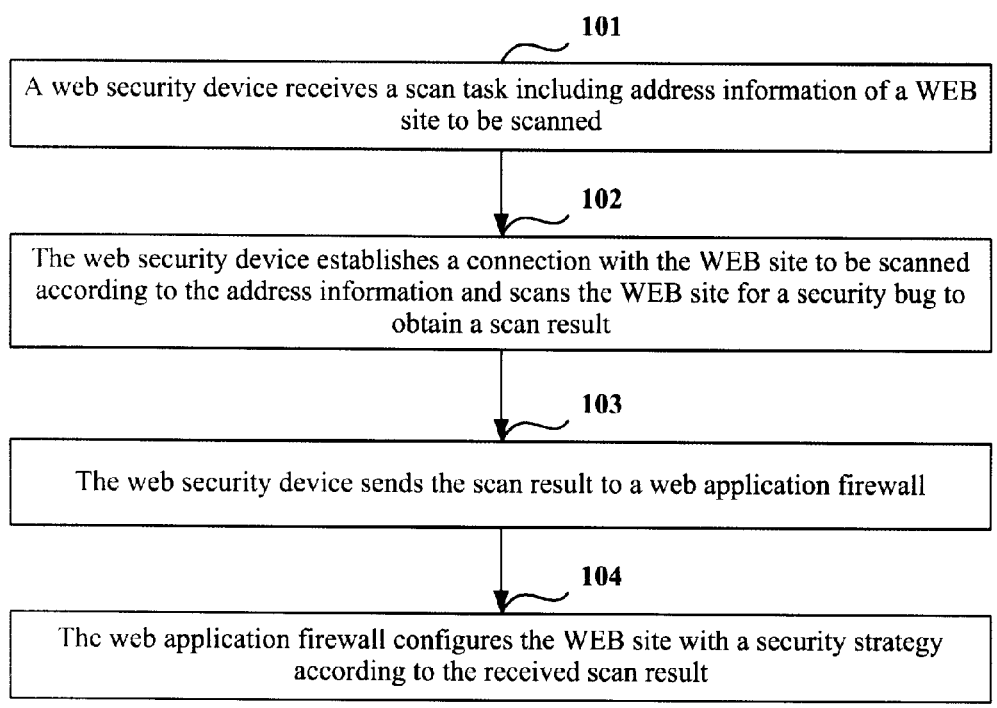
FIG. 1 is a flow chart of a web security protection method according to a first embodiment of the invention.

FIG. 1 is a flow chart of a web security protection method according to the first embodiment. The method includes the following steps:

Step 101: A web security device receives a scan task including address information of a WEB site to be scanned.

In the step 101, when the WEB site to be scanned is intended to be scanned by the web side for a local security bug, the WEB site sends the scan task to the web security device through a WAF to request the web security device to scan the WEB site for a security bug.

The web security device may be assigned with the scan task in numerous ways, for example, the WAF sends the scan task to the web security device, or the scan task is assigned by being manually issued, so how the web security device receives the scan task will not be particularly defined herein.

The address information in the scan task received by the web security device may be address information carried in a scan request initiated by the WEB site to the WAF or may be address information of the WEB site determined by the WAF during signaling interaction between the WEB site and the WAF, e.g., IP address information, site information, a Uniform Resource Locator (URL), etc., of the WEB site. Since the web security device may be assigned with the scan task variously, the address information of the WEB site may alternatively be determined otherwise in this embodiment.

Step 102. The web security device establishes a connection with the WEB site to be scanned according to the address information and scans the WEB site for a security bug to obtain a scan result.

In the step 102, the web security device establishes the connection, e.g., a Hypertext Transfer Protocol (HTTP) web connection, etc., with the WEB site corresponding to the address information according to the address information of the WEB site included in the received scan task.

The web security device can scan the WEB site for a security bug to obtain the scan result after establishing the connection with the WEB site.

The security bug refers to a drawback of the WEB site with respect to a particular implementation of hardware, software or a web protocol, or a system security strategy, or refers to an unintentionally left unprotected entry to a component, an application or another online resource of the WEB site, where the unprotected entry may enable an attacker to access without any grant or destroy the system.

The scan result refers to a scan report list generated by the web security device after scanning the WEB site for a security bug, where the scan report list includes:

a bug scan time indicating the time when the security bug is found by the web security device;

a bug scan address indicating address information of the security bug occurring in the WEB site; and security bug information indicating attribute information of the security bug at the bug scan address.

Taking an SQL injection attack as an example, the generated scan report list includes a piece of information 2011-11-15, 15:30:20, http://www.AAA.com/BBB.html?prodID=x'y'z, where the parameter prodID includes the special character of a single quote, and security strategy rules in the WAF include a rule of detecting a special character for a specific parameter, and since the specific parameter does not include the prodID, the threat of an SQL injection attack may arise, that is, there is a security bug of a webpage being tempered in the WEB site.

Step 103: The web security device sends the scan result to the WAF.

In an implementation of the step 103, the web security device may send the scan result on its own initiative to the WAF after scanning the WEB site and obtaining the scan result; or the WAF may monitor a scan status of the web security device, and the WAF may request the web security device for the scan result upon determination of an end of the scan by the web security device, and then the web security device may send the scan result to the WAF after generating the scan result.

Step 104: The WAF configures the WEB site with a security strategy according to the received scan result.

The security strategy refers to a corresponding protection strategy configured for a security bug of the WEB site to protect the WEB site from a thread due to the security bug and lower a security thread to which the WEB site is subjected.

In an implementation of the step 104, the WAF needs to analyze security bug information, recorded in the received scan result, for a reason of occurring the security bug and to further configure the WEB site with the corresponding security strategy. Taking an SQL injection attack as an example, the WAF may reconfigure the corresponding security strategy according to the scan result and add the parameter prodID into the rule of detecting a special character for a specific parameter.

With the solution according to the first embodiment of the invention, the web security device scans the WEB site for a security bug upon reception of the scan task and generates the scan result for the WEB site, so that the WAF can configure the WEB site with the security strategy for the current real condition thereof according to the scan result, that is, the protection capability of the WAF and the scan capability of the web security device are integrated, and since the web security device can comprehensively scan the WEB site for a security bug, with the solution according to the first embodiment of the invention, the WEB site can be comprehensively scanned for a security bug and further configured intelligently by the WAF with a security strategy for the scan result while generating the security strategy (also referred to as a virtual patch) for protection of the WEB site. On one hand, the security of the WEB site can be greatly improved for the WEB site; and on the other hand, a better WEB protection experience can be brought to a customer served by the WEB site.

Second Embodiment

Figure 2:
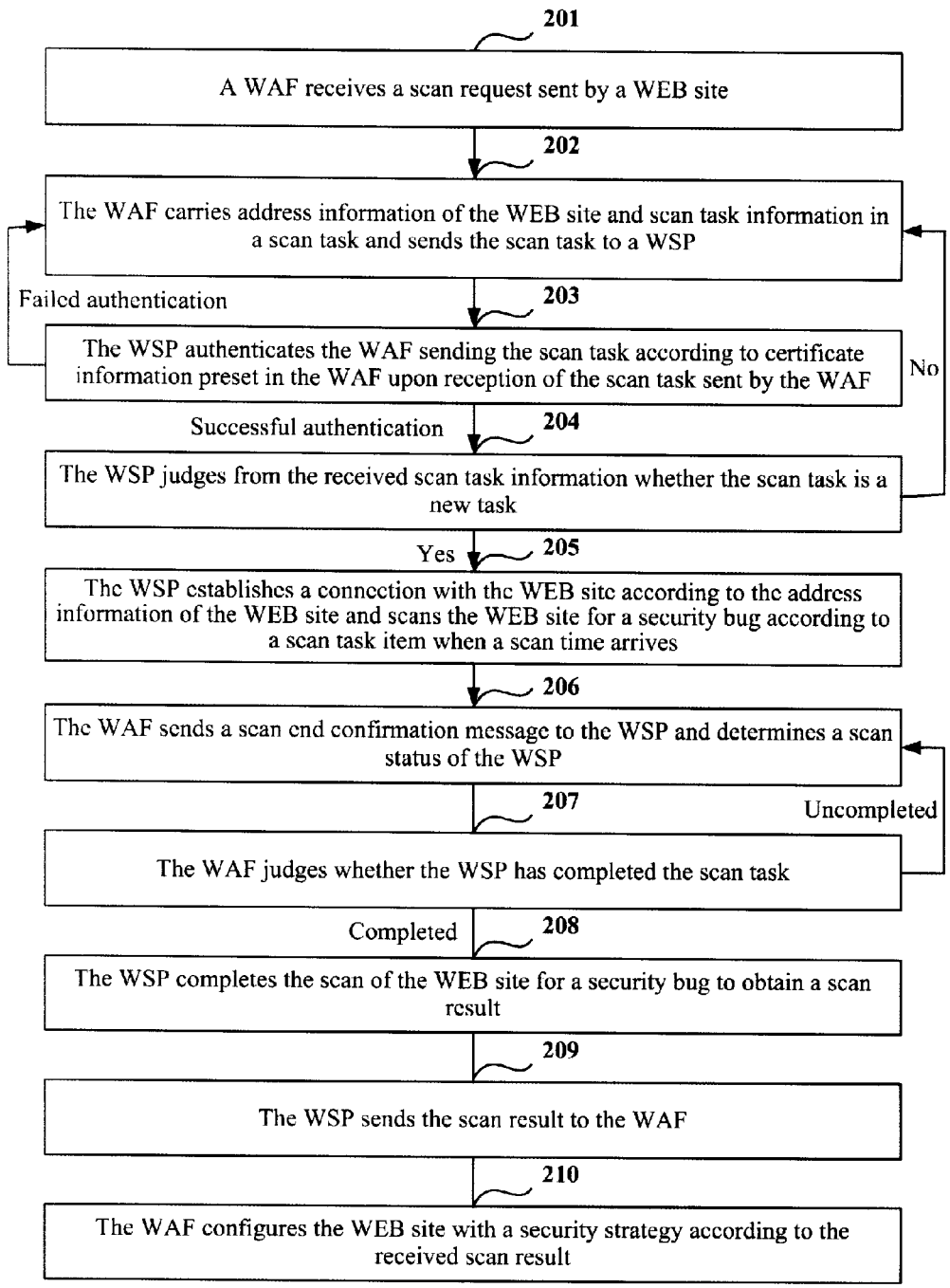
FIG. 2 is a flow chart of a web security protection method according to a second embodiment of the invention.

FIG. 2 is a flow chart of a web security protection method in the second embodiment, and if a web security device in the second embodiment is a WSP, then a solution of the second embodiment includes the following steps:

Step 201: A WAF receives a scan request sent by a WEB site.

Step 202: The WAF carries address information of the WEB site and scan task in formation in a scan task and sends the scan task to the WSP.

The scan task information includes a scan time and a scan task item.

The scan time indicates the start time to start scanning the WEB site by the WSP, and preferably the scan time may further include a cycle at which the WEB site needs to be scanned, so that the WSP scans the WEB site periodically starting from the start time.

The scan task item may include a globally unique identifier (ID) of the scan task, a domain name of the WEB site to be scanned, an identifier of a disk space to be scanned in the WEB site, plug-in information for scan, etc.

Step 203: The WSP authenticates the WAF sending the scan task according to certificate information preset in the WAF upon reception of the scan task sent by the WAF; and if authentication is passed, then the flow proceeds to the step 204; otherwise, the flow proceeds to the step 202.

In the step 203, a bidirectional authentication mechanism is introduced in order to guarantee confidential transmission of communication data, and particularly, the step 203 is performed as follows:

Firstly, the WSP presets a Secure Socket Layer (SSL) certificate (including a key and a version number Cert) in the WAF upon initialization and sends a message carrying an SSL certificate identifier (e.g., an SSL certificate version number, etc.,) to the WAF upon reception of the scan task sent by the WAF in order to guarantee the accuracy of received data;

Then, the WAF retrieves the corresponding SSL certificate according to the received SSL certificate identifier, encrypts the Cert in the retrieved SSL certificate using the key in the SSL certificate and returns an encryption result to the WSP; and Lastly, the WSP decrypts the received encryption result according to the key in the locally stored SSL certificate corresponding to the SSL certificate identifier and has authentication of the WAF passed upon determination legality of the decrypted Cert.

Moreover, the WSP may authenticate the WAF by the OAUTH protocol in addition to the above scheme of authenticating the WAF by the WSP.

The OAUTH protocol is a secure, open and simple standard of granting a user resource. A difference thereof from a prior grant scheme lies in that an OAUTH grant will not have account information of a user (e.g., a username and a password) touched by a third party, that is. the third party can request and be granted for the user resource without an access to the username and the password of the user, so secured authentication can be performed by the OAUTH protocol.

It shall be noted that the WAF may alternatively send the scan task to the WSP after authenticating the WSP in the step 202.

Step 204: The WSP judges from the received scan task information whether the scan task is a new task, and if it is a new task, then the flow proceeds to the step 205; otherwise, the flow proceeds to the step 202.

Particularly, the WSP identifies the scan task information in the scan task upon reception of the scan task and judges from the ID of the scan task in the scan task information whether the scan task to be performed is a new task.

Step 205: The WSP establishes a connection with the WEB site according to the address information of the WEB site and scans the WEB site for a security bug according to the scan task item when the scan time arrives.

Similarly to the step 203, in the step 205, the WSP may perform bidirectional authentication with the WEB site, that is, the WSP authenticates the WEB site as in the implementation of the step 203, and in order to guarantee the security of the WEB site, the WEB site may also authenticate the WSP and allow the WSP to scan the WEB site after authentication of the WSP by the WEB site is passed.

Particularly, the WEB site authenticates the WSP as follows:

Firstly, the WEB site sends a verification code and an SSL certificate identifier to the WSP;

Secondly, the WSP retrieves a corresponding SSL certificate (including a key and a Cert) according to the received SSL certificate identifier;

Thirdly, the WSP performs an encryption operation according to the verification code and the key and the Cert in the retrieved SSL certificate, to obtain a first encryption result;

Fourthly, the WSP sends the first encryption result to the WEB site;

Fifthly, the WEB site performs an encryption operation according to the verification code and a key and a Cert in a locally stored SSL certificate, to obtain a second encryption result; and Sixthly, the WEB site compares the received first encryption result with the calculated second encryption result, and if the first encryption result is consistent with the second encryption result, then authentication of the WSP is passed and the WSP is allowed to scan the WEB site; otherwise, authentication of the WSP is not passed and the WSP is rejected for scanning the WEB site and notified of the result.

Moreover, authentication may alternatively be performed by the OAUTH protocol in the second embodiment.

Step 206: The WAF sends a scan end confirmation message to the WSP to determine a scan status of the WSP.

During scanning the WEB site by the WSP, the WAF sends the scan end confirmation message to the WSP, and if no response message returned from the WSP is received, then it is determined that the WSP is still scanning the WEB site; and if a response message returned from the WSP is received, then it is determined that the WSP has completed the scan of the WEB site.

Step 207: The WAF judges whether the WSP has completed the scan task, and if so, then the flow proceeds to the step 208; otherwise, the WAF continues with monitoring a scan status of the WSP, that is, the flow proceeds to the step 206.

It shall be noted that the step 206 and the step 207 are preferred but not necessary steps in this implementation. In the step 206 and the step 207, a scan result list can be obtained in time and the WEB site can be configured in time with an individualized security strategy by monitoring the scan of the WSP by the WAF.

Step 208: The WSP completes the scan of the WEB site for a security bug to obtain a scan result.

In the step 208, the WSP analyzes security bug information in the scan result, extracts a feature code of the security bug information and determines a possible web threat result resulted from the security bug.

Step 209: The WSP sends the scan result to the WAF.

Particularly, the WSP converts the obtained scan result into a scan result report list in a format of the Extensible Markup Language (XML) and/or the Hyper Text Markup Language (HTML). the security bug of the WEB site is listed in the scan result report list, where the contents of the scan result report list include address information of the scanned WEB site, attribute information of the security bug, the possible web threat result, the form in which the security bug is embodied, etc.

Step 210: The WAF configures the WEB site with a security strategy according to the received scan result.

A particular implementation of the step 210 is as follows:

Firstly, the WAF may compress the scan result into a data package and download it into a domain name file folder allocated locally for the WEB site, and decompress it into a scan result list and feed the scan result list back to the WEB site.

Secondly, the WAF analyzes the security bug information, extracts the feature code of the security bug information and searches a local rule library for the feature code and a security strategy corresponding to the feature code, particularly in the following three situations:

In a first situation, the WAF finds the feature code and a corresponding security strategy configured for the feature code in the rule library, and then may determine the security strategy stored in the local rule library directly as the security strategy configured for the WEB site.

If there is only one corresponding security strategy stored for the feature code of the received security bug information, that is, there is a "one-to-one" relationship between the feature code and the configured security strategy, then the WAF may determine the found security strategy corresponding to the feature code stored in the local rule library as the security strategy configured for the WEB site; and if there are multiple security strategies corresponding to the feature code, that is, there is a "one-to-many" relationship between the feature code and the configured security strategies, then the WAF may select randomly one of the security strategies as the security strategy configured for the WEB site.

Preferably, the WAF may search the local rule library for the time when the feature code and the security strategies are generated and determine the lastly configured security strategy corresponding to the feature code as the security strategy configured for the WEB site upon determining a "one-to-many" relationship between the feature code and the configured security strategies.

In a second situation, the WAF finds the feature code but no corresponding security strategy configured for the feature code in the local rule library, and then the WAF configures a corresponding security strategy according to the determined feature code and a protection rule, stores the corresponding security strategy configured for the feature code in the local rule library and determines the configured security strategy as the security strategy configured for the WEB site.

In a third situation, the WAF does not find the feature code in the local rule library and then writes the feature code into the local rule library, configures a corresponding security strategy for the feature code according to the protection rule, updates the local rule library by storing the feature code and the corresponding security strategy in the local rule library and determines the configured security strategy as the security strategy configured for the WEB site.

Preferably, in this embodiment, the WAF may initiate a request to authenticate the WEB site (as in the step 203 or the step 205) upon reception of the scan request sent by the WEB site, and scan the WEB site and configure the WEB site with a corresponding security strategy according to a scan result after authentication is passed.

Preferably, during scanning the WEB site by the WSP, the WAF may also scan the WEB site, to perform a concurrent scan on the WEB site, and of course, the WAF may instead scan the WEB site before or after the scan by the WSP.

Third Embodiment

Figure 3:
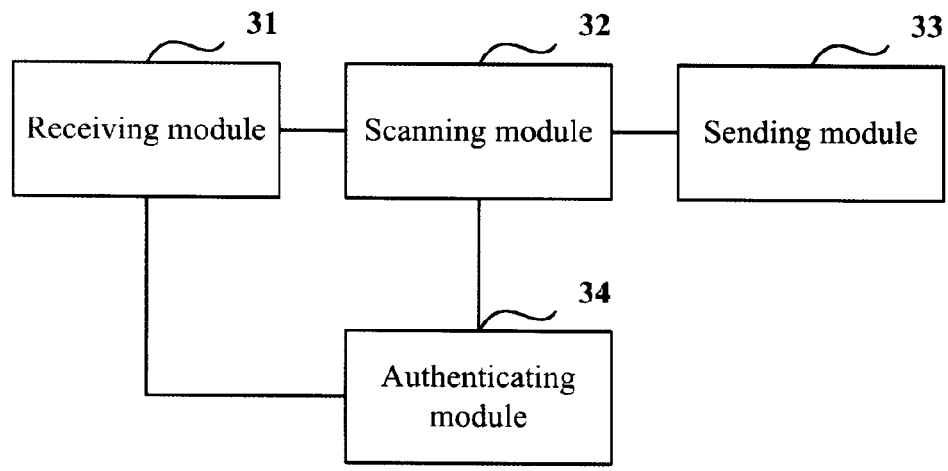
FIG. 3 is a schematic structural diagram of a web security device according to a third embodiment of the invention.

FIG. 3 is a schematic structural diagram of a web security device according to the third embodiment. The device includes a receiving module 31, a scanning module 32 and a sending module 33.

The receiving module 31 is configured to receive a scan task including address information of a WEB site to be scanned;

The scanning module 32 is configured to establish a connection with the WEB site to be scanned according to the address information received by the receiving module 31 and to scan the WEB site for a security bug to obtain a scan result;

The sending module 33 is configured to send the scan result obtained by the scanning module 32 to a WAF to instruct the WAF to configure the WEB site with a security strategy according to the received scan result.

The scanning module 32 is further configured to scan the WEB site for a security bug according to a scan task item when a scan time arrives when the scan task includes the scan time and the scan task item.

Preferably, the device further includes an authenticating module 34 configured to authenticate the WAF sending the scan task according to certificate information preset in the WAF and authenticate the WEB site according to certificate information locally stored at the WEB site before scanning the WEB site for a security bug.

Fourth Embodiment

Figure 4:
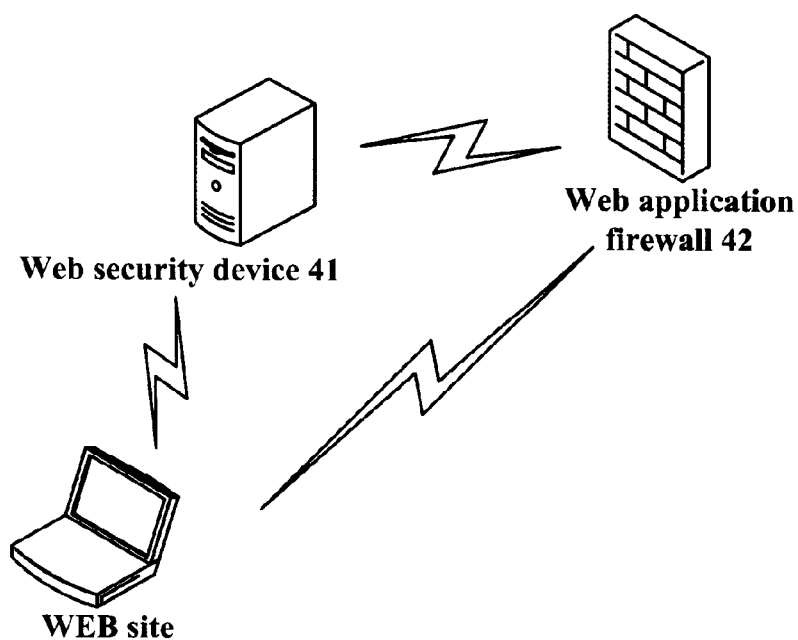
FIG. 4 is a schematic structural diagram of a web security protection system according to a fourth embodiment of the invention.

FIG. 4 is a schematic structural diagram of a web security protection system according to the fourth embodiment. The system includes a web security device and a web application firewall 42.

The web security device 41 is configured to receive a scan task, to establish a connection with a WEB site to be scanned according to address information of the WEB site in the scan task, to scan the WEB site for a security bug and to send a scan result to the web application firewall upon obtainment of the scan result;

The web application firewall 42 is configured to receive the scan result sent by the web security device 41 and to configure the WEB site with a security strategy according to the scan result.

When the received scan result includes security bug information of the WEB site, the web application firewall 42 is further configured to analyze the security bug information, to extract a feature code of the security bug information and to search a local rule library for the feature code and a security strategy corresponding to the feature code, and if they are found, to determine the security strategy corresponding to the feature code stored in the local rule library as the security strategy configured for the WEB site; otherwise, to configure and store in the local rule library a security strategy for the extracted feature code of the security bug information and to determine the configured security strategy as the security strategy of the WEB site.

The web security device 41 is further configured to scan the WEB site for a security bug according to a scan task item when a scan time arrives when the scan task includes the scan time and the scan task item.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently, those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A web security protection method, comprising:
   receiving a scan task including address information of a WEB site to be scanned;
   establishing a connection with the WEB site to be scanned according to the address information and scanning the WEB site for a security bug to obtain a scan result; and
   sending the scan result to a Web Application Firewall, WAF, to instruct the WAF to configure the WEB site with a security strategy according to the received scan result;
   wherein the scan result includes: (a) a bug scan time indicating the time when the security bug is found; (b) a bug scan address indicating address information of the security bug occurring in the WEB site; and (c) security bug information indicating attribute information of the security bug at the bug scan address;
   wherein the scan task further includes a scan time and a scan task item; and
   wherein scanning the WEB site for a security bug further comprises scanning the WEB site for a security bug according to the scan task item when the scan time arrives, wherein the scan task item comprises a globally unique identifier of the scan task, a domain name of the WEB site to be scanned, an identifier of a disk space to be scanned in the WEB site and plug-in information for scan.

2. The method according to claim 1, wherein the scan result includes security bug information of the WEB site; and wherein the WAF configuring the WEB site with the security strategy according to the received scan result further comprises:
   the WAF analyzing the security bug information, extracting a feature code of the security bug information and searching a local rule library for the feature code and a security strategy corresponding to the feature code; and
   if the feature code and the corresponding security strategy are found, then the WAF determining the security strategy corresponding to the feature code stored in the local rule library as the security strategy configured for the WEB site;
   otherwise, the WAF configuring and storing in the local rule library a security strategy for the extracted feature code of the security bug information and determining the configured security strategy as the security strategy configured for the WEB site.

3. The method according to claim 1, wherein before the WEB site is scanned for a security bug, the method further comprises:
   authenticating the WAF sending the scan task according to certificate information preset in the WAF and authenticating the WEB site according to certificate information locally stored at the WEB site.

4. A web security device, comprising:
   a programmable data processing device including a computer program stored in nontransitory computer readable media,
   (a) receiving module configured by code segments of the computer program to receive a scan task including address information of a WEB site to be scanned;
   (b) a scanning module configured by code segments of the computer program to establish a connection with the WEB site to be scanned according to the address information and to scan the WEB site for a security bug to obtain a scan result including (i) bug scan time indicating the time when the security bug is found; (ii) a bug scan address indicating address information of the security bug occurring in the WEB site; and (iii) security bug information indicating attribute information of the security bug at the bug scan address; and
   (c) a sending module configured by code segments of the computer program to send the scan result to a Web Application Firewall, WAF, to instruct the WAF to configure the WEB site with a security strategy according to the received scan result;
   wherein the scanning module is further configured to scan the WEB site for a security bug according to a scan task item when a scan time arrives when the scan task includes the scan time and the scan task item, wherein the scan task item comprises a globally unique identifier of the scan task, a domain name of the WEB site to be scanned, an identifier of a disk space to be scanned in the WEB site and plug-in information for scan.

5. The web security device according to claim 4, further comprising:
an authenticating module configured to authenticate the WAF sending the scan task according to certificate information preset in the WAF and authenticate the WEB site according to certificate information locally stored at the WEB site before the WEB site is scanned for a security bug.

6. A web security protection system, comprising:
a web security device including a first processor and first non-transitory computer readable media, the web security device being configured by code segments stored in the first non-transitory computer readable media to receive a scan task, to establish a connection with a WEB site to be scanned according to address information of the WEB site in the scan task, to scan the WEB site for a security bug and to send a scan result to a Web Application Firewall; WAF, upon obtainment of the scan result; and
the web application firewall including a second processor and second non-transitory computer readable media, the web application firewall being configured by code segments stored in the second non-transitory computer readable media to receive the scan result sent by the web security device and to configure the WEB site with a security strategy according to the scan result;
wherein the scan result includes: (a) a bug scan time indicating the time when the security bug is found; (b) a bug scan address indicating address information of the security bug occurring in the WEB site; and (c) security bug information indicating attribute information of the security bug at the bug scan address;
the web security device is further configured to scan the WEB site for a security bug according to a scan task item when a scan time arrives when the scan task includes the scan time and the scan task item, wherein the scan task item comprises a globally unique identifier of the scan task, a domain name of the WEB site to be scanned, an identifier of a disk space to be scanned in the WEB site and plug-in information for scan.

7. The system according to claim 6, wherein:
when the received scan result includes security bug information of the WEB site, the web application firewall is further configured to analyze the security bug information, to extract a feature code of the security bug information and to search a local rule library for the feature code and a security strategy corresponding to the feature code, and if the feature code and the corresponding security strategy are found, to determine the security strategy corresponding to the feature code stored in the local rule library as the security strategy configured for the WEB site; otherwise, to configure and store in the local rule library a security strategy for the extracted feature code of the security bug information and to determine the configured security strategy as the security strategy of the WEB site.

* * * * *